United States Patent [19]

Kmetz et al.

[11] 4,241,344

[45] Dec. 23, 1980

[54] ELECTRO-OPTICAL DEVICE FOR THE DISPLAY OF DARK SYMBOLS COMPOSED OF SEPARATELY SELECTABLE DISPLAY SEGMENTS AGAINST A BRIGHT BACKGROUND AND A MEANS FOR ADDRESSING THIS DEVICE

[75] Inventors: Allan R. Kmetz, Nussbaumen; Klaus Müller, Baden; Terry J. Scheffer, Forch, all of Switzerland

[73] Assignee: BBC Brown, Boveri & Company, Limited, Baden, Switzerland

[21] Appl. No.: 27,382

[22] Filed: Apr. 5, 1979

Related U.S. Application Data

[62] Division of Ser. No. 925,539, Jul. 17, 1978.

[30] Foreign Application Priority Data

Jul. 29, 1977 [CH] Switzerland .................. 9397/77

[51] Int. Cl.³ ............................................. G09F 9/35
[52] U.S. Cl. ..................................... 340/765; 340/756; 350/336
[58] Field of Search ..................... 340/765; 350/336

[56] References Cited

U.S. PATENT DOCUMENTS

| | | | |
|---|---|---|---|
| 3,647,280 | 3/1972 | Klein et al. | 350/336 |
| 3,740,717 | 6/1973 | Huener et al. | 340/765 X |
| 3,891,306 | 6/1975 | Mitomo et al. | 340/765 X |
| 3,891,307 | 6/1975 | Tsukamoto et al. | 340/765 X |
| 3,930,719 | 1/1976 | Madrid et al. | 350/336 |
| 4,035,060 | 7/1977 | Tsunoda et al. | 350/336 |
| 4,105,297 | 8/1978 | Shimizu | 350/336 |
| 4,153,344 | 5/1979 | Hamada et al. | 350/336 |

*Primary Examiner*—David L. Trafton
*Attorney, Agent, or Firm*—Oblon, Fisher, Spivak, McClelland & Maier

[57] ABSTRACT

An electro-optical display for the display of dark symbols against a bright background, wherein except for fine separation lines the front and rear cell plates are almost entirely covered with isolated electrode elements. The regions of overlap between these various front and rear electrode elements define the areas of the selectable display segments. The display employs an electro-optic media requiring no polarizers, for example, cholesteric liquid crystals to which has been added pleochroic dyes, or electrophoretic suspensions. The display device is addressed through the application of appropriate signals to the electrodes so that a vanishingly small potential difference lies across the liquid crystal layer in the region of the selected display segments which remain dark. In all the other regions of the display, however, there exists a potential difference which is larger than the transition voltage of the electro-optical medium, and these regions therefore appear as a bright background. The addressing is preferably carried out using unipolar pulsed signals which are applied to the electrode elements of the front and rear cell plates, with those electrodes corresponding to optically selected display segments receiving signals having the same phase and amplitude.

7 Claims, 10 Drawing Figures

ELECTRO-OPTICAL DEVICE FOR THE DISPLAY OF DARK SYMBOLS COMPOSED OF SEPARATELY SELECTABLE DISPLAY SEGMENTS AGAINST A BRIGHT BACKGROUND AND A MEANS FOR ADDRESSING THIS DEVICE

This is a division of application Ser. No. 925,539, filed July 17, 1978.

BACKGROUND OF THE INVENTION

1. Field of the Invention

The present invention relates to an electro-optical device for the display of dark symbols composed of separately selectable display segments against a bright background, and to means of addressing this kind of display device.

2. Description of the Prior Art

A display device is known from the German Patent Disclosure DT-OS 24 50 698 where the area of each electrode element of the front electrode has the same shape and area as the display segments themselves. The liquid crystalline medium between the front and the rear electrode elements corresponding to a particular symbol can be optically activated by applying electrical signals to these electrodes. The ambient light falling upon this region is scattered so that an observer can read the selected symbol. Display cells of this type are designed to use the Dynamic Scattering Effect. Such displays are not always suitable when electro-optical media are employed that operate upon other electro-optical effects. For example a cholesteric guest-host electro-optic substance would display bright symbols against a dark background in such a display cell. This is generally not desirable because optimum readability of a displayed symbol is obtained when it appears as a dark area against a bright background, like the printed letters of a newspaper. Display devices employing cholesteric guest-host substances, on the other hand, are especially attractive because they require lower operating voltages and have a lower power consumption than dynamic scattering displays and, compared to twisted nematic displays, they don't need polarizers or special surface treatments on the inner walls of the cell.

SUMMARY OF THE INVENTION

Accordingly, one object of this invention is to provide a display device where a high-contrast display of dark symbols against a bright background can be achieved with low addressing voltages and without the use of polarizers.

Another object of this invention is to provide a simple means of addressing such a display so that very little power is required.

A characteristic feature of the display device of the present invention is that the front electrode covers nearly the entire area of the front cell plate except for narrow lines (narrow in comparison with the width of the display segments) where the electrode material has been removed in order to divide the remaining area up into mutually insulated electrode elements. With regard to the second object of the present invention, relating to a means of addressing the display when the electro-optic medium is a cholesteric guest-host liquid crystal substance, two characteristic features are evident. Firstly, the electrode elements corresponding to the selected symbols are addressed with electrical signals having the same amplitude, frequency, phase and waveform. Secondly the electrode elements corresponding to unselected symbols as well as the display background are driven with electrocal signals whose difference voltage in every part of the background is larger than the transition voltage of the electro-optical medium.

The electro-optical device of the present invention displays dark symbols against a light background with an extremely high contrast ratio even when the display is illuminated with unpolarized light and addressed with comparatively low-amplitude signals. Another advantage of the display device of the present invention is that it can employ the integrated circuits that are presently used to address the conventional twisted nematic displays.

With the electrode layout of the present invention it is no longer necessary that the electrode elements on the front cell plate have the same shape and area as the corresponding display segments. In the present invention this is accomplished by arranging the separation lines on the front electrode so that at least one section coincides with at least one third of the circumference of at least one of the symbols to be displayed. Similarly, the separation lines on the rear electrode are arranged to coincide with at least another third of the circumference of that same symbol.

In another embodiment of the present invention it is desirable to employ a guest-host liquid crystal substance as the electro-optical medium, in particular a cholesteric liquid crystal containing at least one pleochroic dye. In such a display the potential difference applied between the electrodes corresponding to an optically selected display segment is smaller than the transition voltage of the electro-optic material. This type of display device is characterized by its good readability, even at very large viewing angles. The reproduction of colored information is relatively simple with this type of device.

Other electro-optical media can be employed in the display device of the present invention instead of the cholesteric liquid crystal with added pleochroic dye. Another electro-optical medium which is particularly suitable for applications requiring a minimal power consumption is an electrophoretic suspension of positively or negatively charged pigment particles.

In order to maintain a uniformly bright background in the display with the conduction paths leading to the electrode elements remaining invisible it is suggested that, except for one element, each of the other electrode elements on the front cell plate completely overlap with each of the display segments, and that the rear electrode be divided into two elements, one of which overlaps with all the display segments. It is further suggested that the one electrode element on the front cell plate that does not overlap with any display segment completely overlap with the conduction path leading to the electrode segment on the rear cell plate that overlaps with all the display segments, and that the electrode element of the rear cell plate that does not overlap with any of the display segments completely overlap with all the conduction paths on the front cell plate that lead to electrode elements that overlap with display segments.

A considerable reduction of the power consumption of the display device of this invention can be obtained by keeping the area of the conduction paths leading to the electrode elements on the front cell plate that overlap with the display segments as small as possible.

It is possible to plug the display of this invention into standard connector sockets by arranging the conduction paths leading to all the electrode elements of the display so that they terminate at contact strips arranged along one edge of the front galss plate.

A display of especially high contrast results when a metallic reflecting but electrically insulating layer is applied to the rear electrode in such a way that the separation lines are covered over.

The characteristic features of an addressing technique designed for the display of the present invention is described below. This driving scheme employs conventional integrated circuits which can be operated at voltages up to 15 v and is suitable for use with liquid crystalline media whose transition voltages do not exceed 7.5 v. Square-wave signals whose amplitudes are at least twice the transition voltage are applied to the electrodes of the front cell plate that overlap with the areas of the selected display segments. The other electrodes on the front cell plate are addressed with a square wave signal having the same amplitude, frequency and waveform, but which has been phase-shifted up to a half period. The electrode on the rear cell plate that does not overlap with any of the display segments is driven with a d.c. voltage with a potential of exactly half the amplitude of the square-wave signal.

In another embodiment, the addressing scheme requires only one voltage level. Here the electrodes on the front cell plate overlapping with the unselected display segments as well as the electrode on the front cell plate that does not overlap with any display segment are addressed with a signal that is phase-shifted up to a half-period with respect to a signal having the same amplitude, frequency and waveform that is fed to the electrodes on the front cell plate that overlap with the selected display segments. The electrode element on the rear cell plate that does not overlap with any display segments is addressed with a signal of higher frequency—preferably a higher harmonic of the first signal. The advantage of addressing the display device of the present invention with this scheme is that since only one voltage level is required, it is not necessary to maintain two voltage levels to a close tolerence in order to prevent damaging d.c. components from being generated that could decompose the liquid crystal. Furthermore, this addressing scheme is also suitable for addressing display devices of the present invention that have transition voltages higher than 7.5 v using integrated circuits with a voltage supply limit of 15 v.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF THE PREFERRED EMBODIMENTS

Figure 1:
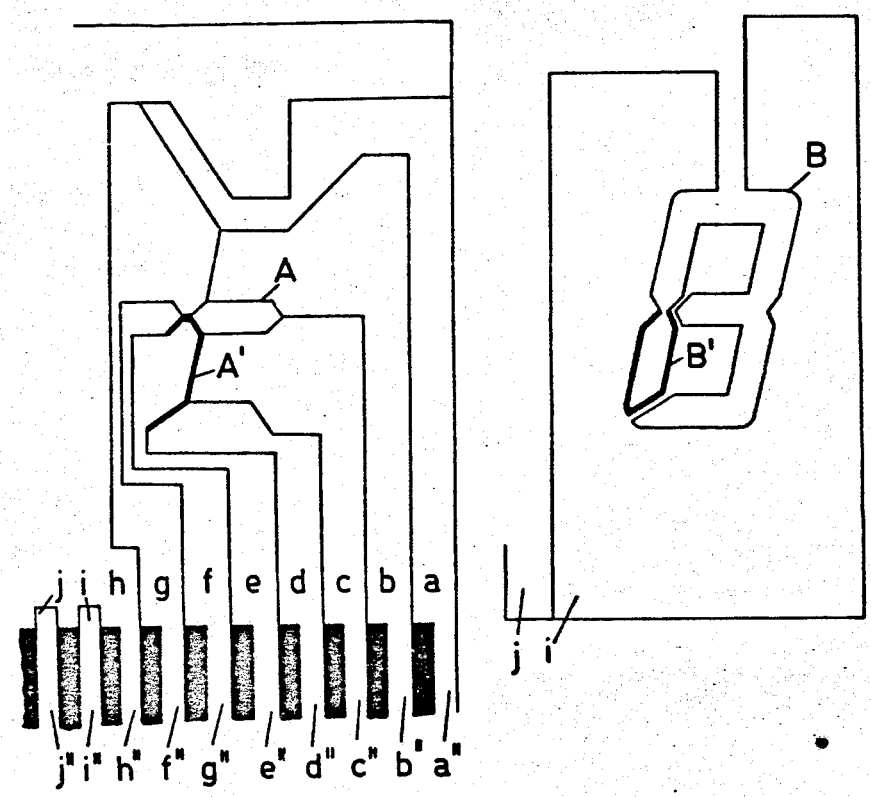
FIG. 1 is a view of the front and rear electrode patterns in the display device of the present invention.

Referring now to the drawings, wherein like reference numerals designate identical or corresponding parts throughout the several views, and more particularly to FIG. 1 thereof, the left side of FIG. 1 shows a view of the front electrode pattern applied to the transparent front cell plate of a possible embodiment of the display device of the present invention. The right side of FIG. 1 shows a view of the corresponding rear electrode pattern applied to the rear cell plate. The letters a, b, . . . , g, h are used to identify the electrode elements of the front cell plate and the letters, i, j are used for the electrode elements of the rear cell plate. Conduction paths lead from the electrode elements of the contacts a", b", . . . , i", j" located at the edge of the front cell plate. The black lines between the electrodes designate the separation lines A, A', B, B' which serve to electrically insulate the electrode elements from each other. Except for these separation lines, electrode elements cover nearly the entire area of the front and rear cell plates.

Figure 2:
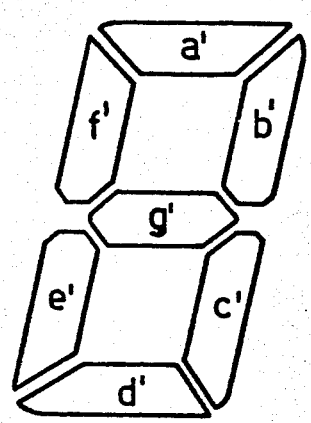
FIG. 2 is a view of the display segments of the display device shown in FIG. 1.

FIG. 2 shows the display segments a', b', . . . , g' of this display device which can be made visible when they are optically selected. Each of these display segments is completely covered over by a corresponding electrode element of the front cell plate, and the area of all these display segments taken together is completely covered over by the counter-electrode j on the rear cell plate. The outer boundary of each display segment is defined by the region of overlap between the corresponding electrode element of the front cell plate and the electrode element j of the rear cell plate.

Besides the electrode elements of the front cell plate a, . . . , g which are necessary for the display segments a', . . . , g' there is an additional electrode element h whose area does not coincide with any of the display segments. The lower edge of the front cell plate has not only the contacts of all the electrode elements found on the front cell plate, but also the contacts i" and j" corresponding to the two electrode elements i,j on the rear cell plate as well. This edge of the front cell plate can, for example, be inserted into a standard connector socket so that every electrode of the display device is readily accessable. Electrical connection between the electrode elements i and j and the corresponding contacts i" and j" is facilitated by leading the conduction paths of the rear electrode elements i and j out to the edge of the cell plate so that they lie just opposite the contacts.

The electrode element h of the front cell plate completely overlaps with the conduction path of the electrode j on the rear cell plate, and the electrode element i of the rear cell plate completely overlaps with all the conduction paths of the electrode elements a, b, ..., g on the front cell plate. The term conduction path refers to that part of an electrode element which does not coincide with a display segment. This type of electrode arrangement prevents the conduction paths from becoming visible when the display device is in operation.

Figure 3:
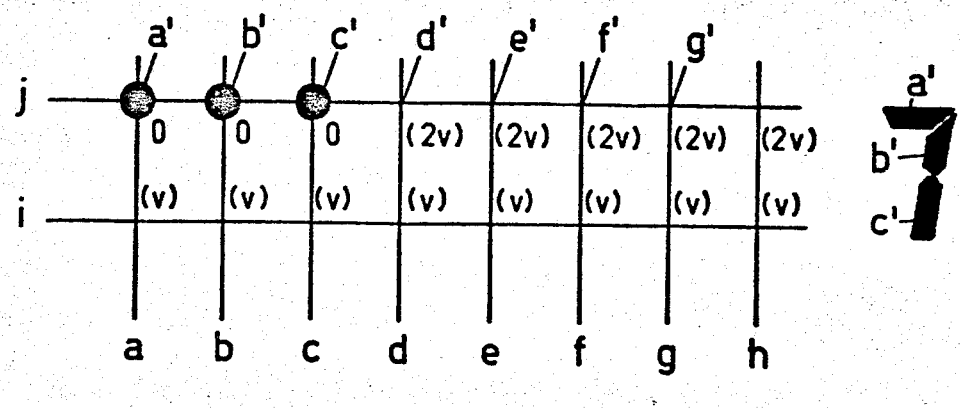
FIG. 3 is a schematic representation of the display device of FIG. 1, where the electrode elements are represented by a two-row matrix, and three display segments are optically selected.

FIG. 3 shows a simplified schematic representation of the display device of FIG. 1 where the electrode elements are represented by a two-row matrix. The two electrodes i and j of the rear cell plate are represented by two horizontal lines and the electrode elements a, b, ..., h of the front cell plate are represented by eight vertical lines. The crossover points of these lines correspond to those regions in the display where the corresponding front and rear electrodes overlap and a local electric field can be generated.

Figure 4:
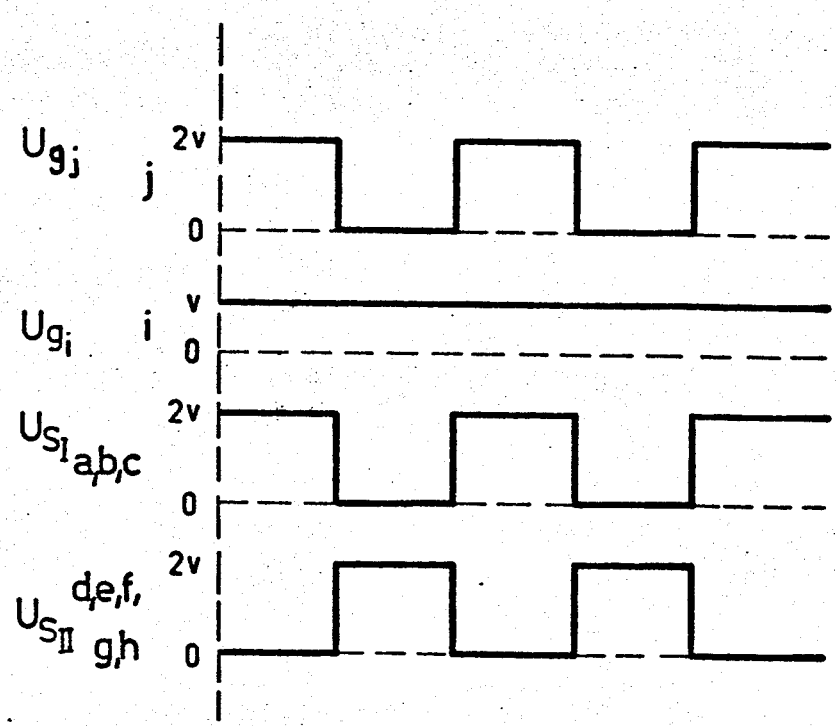
FIG. 4 is a schematic representation of the addressing signals that are applied to the electrodes of the display device of FIG. 3.

Consider the example where the number "7" is to be displayed. According to FIGS. 1 and 2, the display segments a', b' and c' are optically selected and therefore must remain dark; the liquid crystal layer in these regions has no electric field applied across it. The remaining part of the liquid crystal layer forming the display background, however, must be in a sufficiently strong electric field to give a bright display background. This can be accomplished, for example, by addressing the electrode elements a, b, ..., j with the signals shown in FIG. 4. Here the electrode j is addressed with a pulsating d.c. signal $U_{gj}$ having an amplitude 2 V and a 50% duty cycle, while the second rear electrode element i is addressed with a continuous d.c. signal $U_{gj}$ having a potential V. The electrode elements a, b, and c of the front cell plate corresponding to the optically selected display segments are addressed with the same pulsating d.c. signal $U_{SI}$ which is applied to the electrode j of the rear cell plate. All other electrode elements of the front cell plate d,e,f,g and h are addressed with a pulsating d.c. signal $U_{SII}$ which has the same amplitude as the signal fed to the optically selected elements, but is phase-shifted by 180°. A vanishingly small potential difference therefore lies across the liquid crystal layer in the region of the optically selected display segments a', b' and c', while the liquid crystal layer in the region of the optically unselected display segments d', e', f' and g' and the region of coincidence between the electrodes h and j has a potential difference 2 V applied across it. All other regions of the liquid crystal layer lie under a potential difference of V. No region of the liquid crystal layer ever receives a constant d.c. potential, so that electrochemical decomposition of the liquid crystal is essentially eliminated.

The voltage level V is chosen to lie above the critical voltage $U_c$ where the cholesteric liquid crystal phase completely transforms to the nematic phase. This voltage will hereafter be referred to as the "transition voltage". No further reorientation of the liquid crystal takes place above this transition voltage, and the electro-optical properties characterized by this device reach saturation values.

Figure 5:
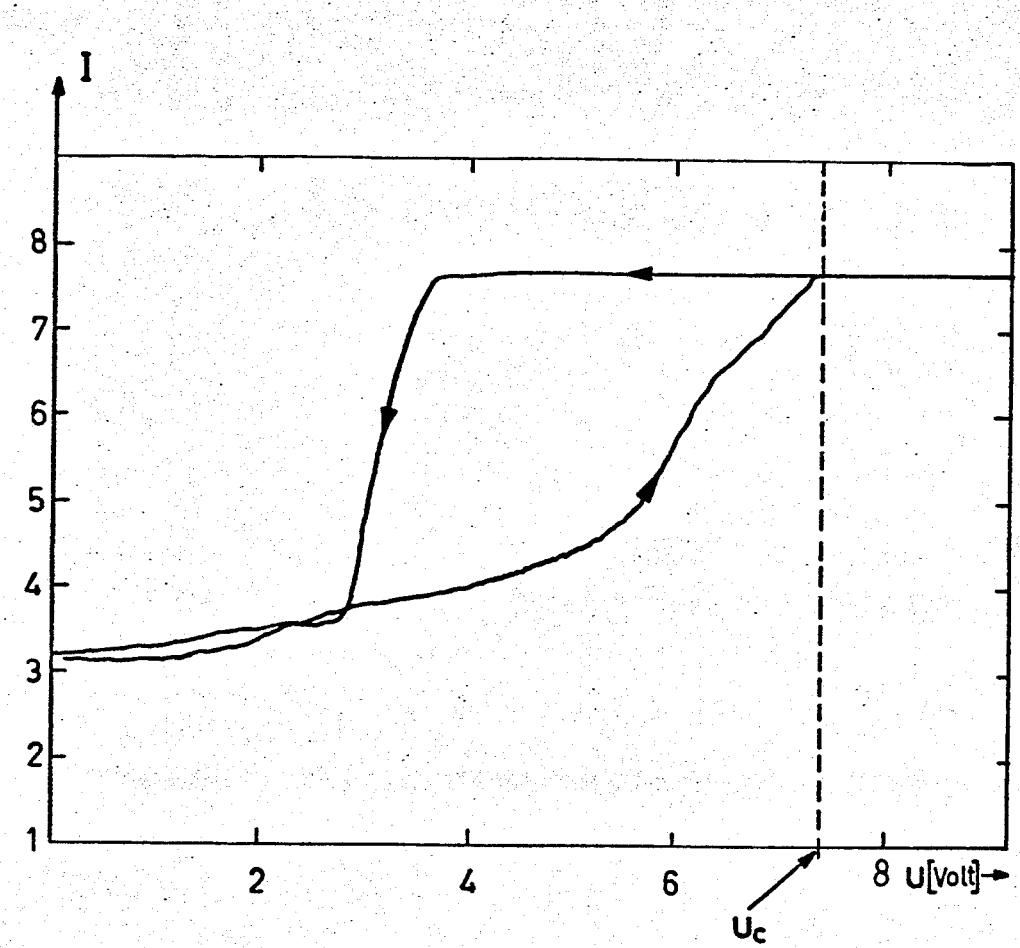
FIG. 5 is a graph of the dependence of the background brightness of the display device of FIG. 1 as a function of the effective potential difference U applied across the electrodes.

FIG. 5 shows the brightness I of the ambient light reflected from the rear cell plate as a function of the voltage U applied to the cell. This particular display cell contains an 8 μm thick guest-host liquid crystal layer composed of:

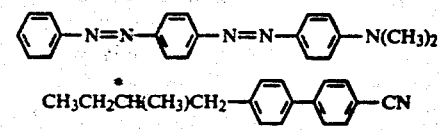

94% of a nematic liquid crystal mixture containing components belonging to the biphenyl family of liquid crystals.

Because of the sharp rise and rapid attainment of saturation of the optical characteristics, this substance operates just as well with an applied voltage of V (greater than the transition voltage $U_c$) as it does with an applied voltage of 2 V. All bright regions of the display, which according to FIG. 3 have potential differences of either V or 2 V, therefore have an identical optical appearance.

The power consumption of such a display is naturally of great importance because practically the whole area of the display cell is under an applied voltage. It is therefore advisable to drive the display at as low a frequency as is practical, say 2 Hz, in order to minimize the loss due to the capacitive component of the cell current.

The display addressing scheme described above has the advantage that the same integrated circuits can be employed that are used for the conventional twisted nematic displays. The only additional components required are a simple logic inverter and a voltage divider.

Figure 6:
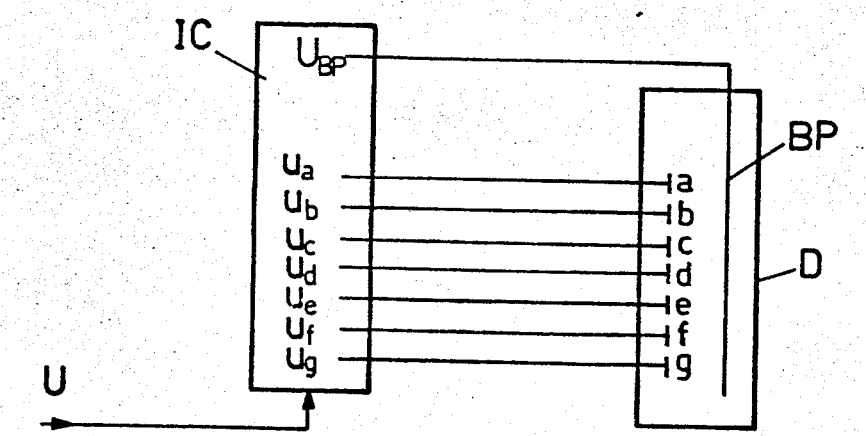
FIG. 6 is a schematic representation of the components used to address the conventional twisted nematic display.

FIG. 6 shows the components used to address the conventional twisted nematic displays. An integrated circuit IC, powered by a d.c. potential U, delivers pulsating d.c. signals with 50% duty cycles $U_a, \ldots, U_g$ to the front electrodes a, ..., g of a liquid crystal display cell D, as well as a signal $U_{BP}$ to the common rear electrode BP of the display.

Figure 7:
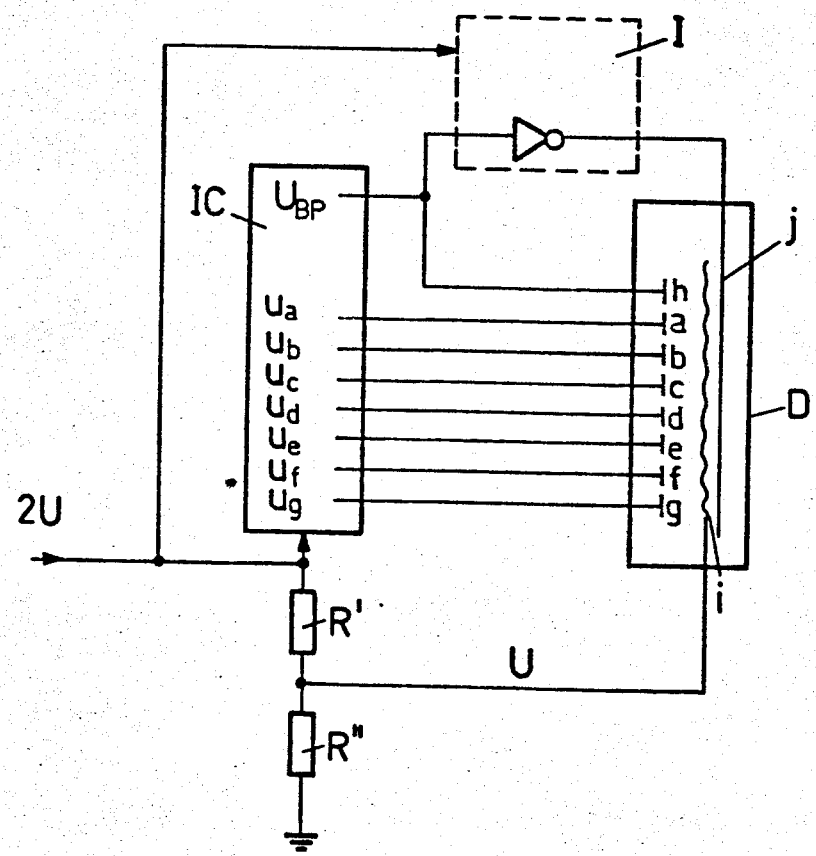
FIG. 7 is a schematic representation of the components used to address the display of FIG. 1.

FIG. 7 shows the components used to address the display of the present invention shown in FIG. 1. The same integrated circuit IC employed in FIG. 6 can also be employed here, except this time it is powered by a d.c. potenital of 2U. A part of the $U_{BP}$ signal is now fed to the front electrode h and a further part is fed to an inverter I (e.g. a RCA CD 4041 A) where it is phase-shifted by 180° and applied to the rear electrode j. The other rear electrode i is supplied with a continuous d.c. voltage of potential U which can, for example, be derived from a simple resistive voltage divider R', R". The connections to the other electrodes of the display cell are the same as those to the conventional display shown in FIG. 6.

Figure 8:
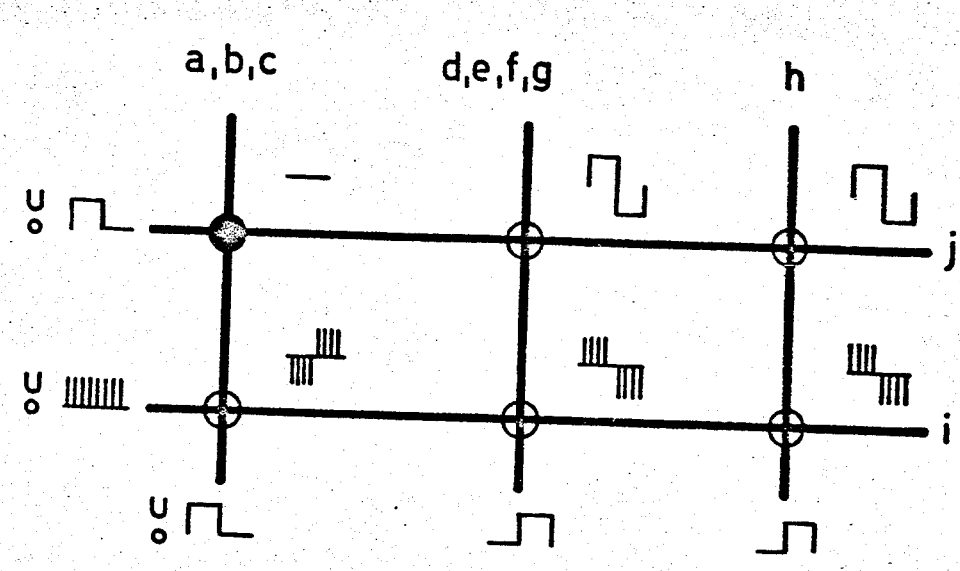
FIG. 8 is a schematic representation of an addressing technique used for the display of FIG. 1.

Another means of addressing the display device of the present invention is given below. A simplified illustration of this addressing scheme is given in FIG. 8. All addressing signals are unipolar pulse trains having an amplitude U and a 50% duty cycle. The front and rear electrodes corresponding to the optically selected elements a', b' and c' receive the same signals, so that there is no net potential difference across the layer and the liquid crystal remains in the light-absorbing cholesteric phase in these regions. The front and rear electrode elements corresponding to the optically unselected display segments d', e', f' and g', on the other hand, receive pulses that are 180° out of phase with the first signal, with the result that the potential difference is a bipolar square wave of amplitude U having no d.c. component. As long as U is greater than the transition voltage $U_c$, the liquid crystal layer in these regions will be in the weakly-absorbing nematic state. The electrode element i on the rear cell plate, which overlaps with the conduction paths on the front electrodes, is addressed with a higher frequency signal, preferably a higher harmonic of the signals applied to the electrodes on the front cell plate. The potential difference across the region of overlap between the front electrodes and the rear electrode i then have the waveforms that are sketched in FIG. 8. Since the high frequency signals also have a pulse height U and a 50% duty cycle, the polarity of this potential difference alternates with the period of the low frequency signal. The areas of the display defined by the rear electrode i will remain in the weakly-absorbing nematic liquid crystal state, regardless of the phase of the signals applied to the front electrodes, as long as U lies sufficiently above the transition voltage $U_c$ and the pulse frequency is rapid enough.

The front electrode element h is addressed just like the electrode corresponding to an optically unselected segment. By this means the liquid crystal layer in the entire display background, including the areas of the optically unselected segments and the conduction paths, is maintained in the nematic phase, and only the liquid crystal layer in the regions of the optically selected display segments remain in the light-absorbing cholesteric phase.

Since only one voltage level is required, a special advantage of this addressing scheme is that the step of painstakingly adjusting the relative amplitudes of two voltage levels to prevent the occurrence of damaging d.c. components can be omitted. For watch displays, for example, the required high frequency signal can be tapped off from an early stage of the frequency divider chain found in the usual circuits used to drive conventional twisted nematic displays. Furthermore, this driving scheme is also suitable for addressing display devices of the present invention which have transition voltages greater than 7.5 v using integrated circuits having a supply voltage limit of 15 v.

Figure 10:
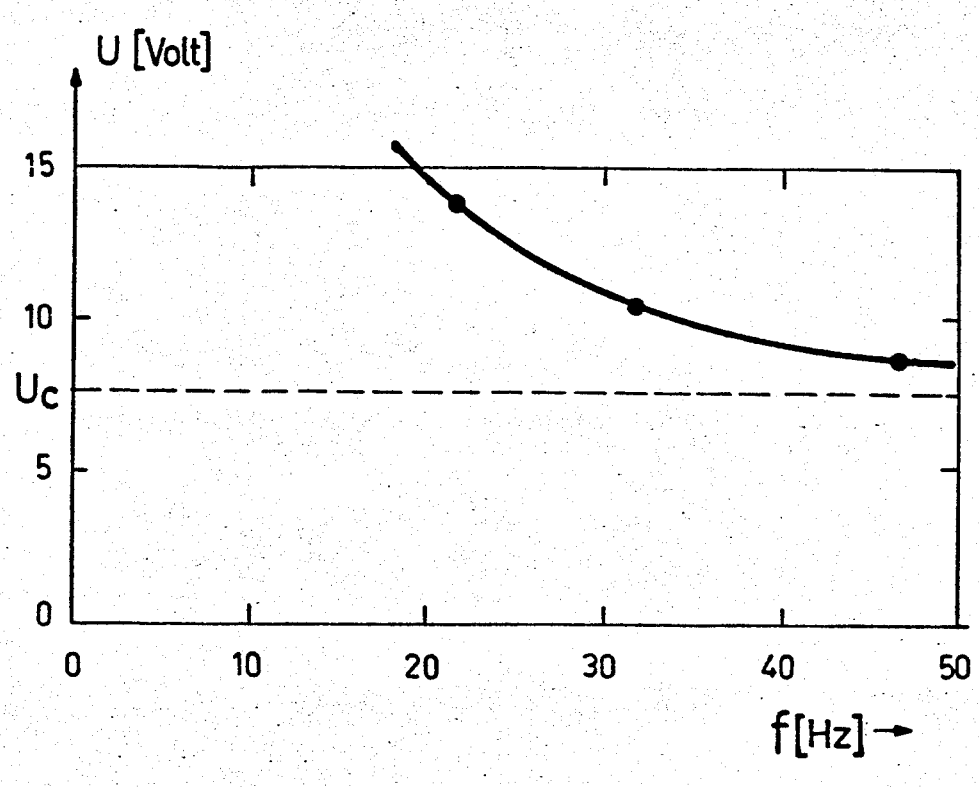
FIG. 10 The minimum potential difference required to obtain and maintain the nematic phase of a cholesteric liquid crystal as a function of the frequency of the high-frequency signal applied to the electrode element i in the addressing scheme shown in FIG. 6.

FIG. 10 shows the minimum potential difference U required to obtain and maintain the nematic phase of a cholesteric liquid crystal as a function of the frequency of the high frequency siganl applied to the electrode element i. The liquid crystal for these measurements had a transition voltage of 7.5 v. Below 20 Hz display flicker effects cannot be eliminated by increasing the amplitude of the driving voltages. A suitable display that has practically no flicker is obtained with $U=10$ v and $f=30$ Hz.

Figure 9:
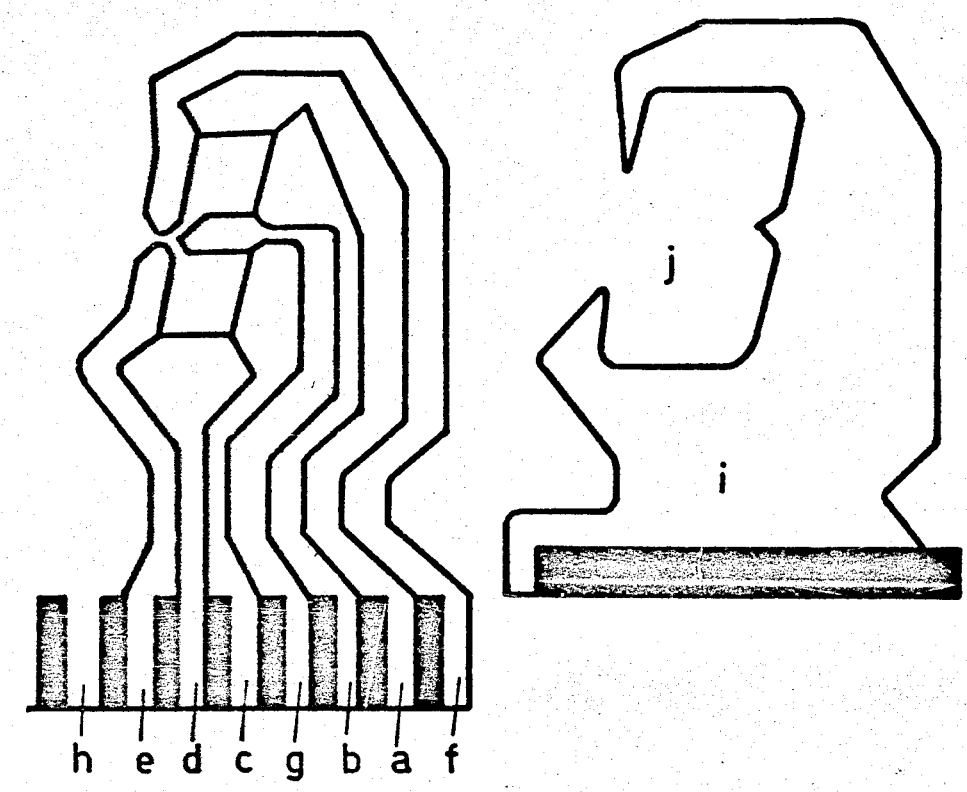
FIG. 9 is a view of the front and rear electrode pattern of another embodiment of the display device of the present invention.

The energy consumption in this display is largest in the regions where the high frequency signal is present, because of losses associated with the capacitive component of the cell current. It is therefore advisable to reduce the areas of these regions. This can be accomplished by changing the electrode patterns to those that are shown in FIG. 9. In this arrangement the areas of the conduction paths of the electrodes a, . . . , g on the front cell plate as well as the area of the corresponding counter-electrode i on the rear cell plate are kept as small as possible. It is also possible to terminate some of the conduction paths of the electrodes a, . . . , g to contacts on the opposite edge of the front cell plate. Using these two measures, the power consumption of the display device of this invention can be decreased by about a factor of 2.

The electro-optic medium of the display device of the present invention is not just limited to cholesteric guest-host liquid crystals. Electrophoretic suspensions are also suitable, especially because these types of substances require a finite potential difference over the entire area of the display in order to obtain and maintain a well-defined optical state. A special advantage of applying this invention to electro-phoretic systems is that, using the 7-segment display as an example, a number can be displayed without having the conduction paths leading to the corresponding segments becoming visible.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In an electro-optical display device for the display of dark symbols against a bright background, wherein a plurality of separately selectable display segments are formed by a transparent front electrode applied to the surface of a transparent front cell plate and a rear electrode applied to the surface of a rear cell plate between which is located an electro-optical medium formed by a guest-host liquid crystal mixture, in particular a cholesteric liquid crystal with at least one added pleochroic dye, said cholesteric liquid crystal exhibiting a transition voltage where the cholesteric liquid crystal phase transforms to a nematic phase, said front electrode composed of a plurality of electrode elements that are electrically insulated from each other, said rear electrode composed of at least two electrode elements that cover nearly the entire area of the rear cell plate except for fine separation lines which serve to insulate them from each other, said front and said rear electrode elements having conduction paths leading to them, said front electrode having narrow separation lines which serve to electrically insulate the electrode elements thereof from each other and whose dimensions are small compared to the dimensions of the displayed symbols, said front electrode, except for said narrow separation lines, covering nearly the entire area of the front cell plate, and wherein at least one section of the separation line on the front electrode coincides with at least one third of the circumference of at least one display segment of a display symbol and at least one section of the separation line on the rear electrode coincides with at least one third of the circumference of the same display segment, improved means for driving the front and rear electrodes corresponding to an optically selected display element, comprising:

means for addressing the display device whereby selected electrode segments are displayed against said bright background, said addressing means comprising, first means for applying first unipolar addressing signals to the selected front and rear electrodes corresponding to the selected display segments of a desired symbol, said first addressing signal having the same amplitude, frequency, phase and waveform, and second means for applying second addressing signals to the front and rear electrodes corresponding to unselected display segments, said second signals producing a potential difference in every region of the display background larger than the transition voltage of the electro-optical medium.

2. A display device according to claim 1 wherein said addressing means further comprises:

said second signals applied to the electrodes on the front cell plate corresponding to optically unselected display elements as well as the rear electrode element which does not coincide with any of the display elements comprising a signal phase shifted by at most a half-period and having the same amplitude, frequency and waveform as said first addressing signals applied to the electrodes corresponding to the optically selected display segments; and, said second signals applied to the electrode on the rear cell plate which does not overlap with any display segment comprising a signal which has a higher frequency than the other of said first and said second addressing signals.

3. A display device according to claim 2 wherein the frequency of said higher frequency second signals is a harmonic of those of said first signals applied to said selected electrodes.

4. A display device according to claim 1, further comprising:

said first addressing signals comprising a square wave signal having an amplitude that is at least twice the transition voltage of the electro-optical medium;

said second addressing signals applied to the unselected front electrodes comprising a square wave signal having the same amplitude frequency and waveform as the said first addressing signals, but shifted in phase relative thereto by at most a half period; and said second addressing signal applied to the electrode on the rear cell plate which does not overlap with any display segment comprising a d.c. voltage having half the amplitude of said first addressing signals.

5. A display device according to claim 4 wherein said first addressing signals have a frequency of at most 10 Hz.

6. A display device according to claim 3 wherein the high frequency second addressing signals applied to the electrode on the rear cell plate which does not overlap any display segment has a frequency in the range from 20 to 50 Hz.

7. A display device according to claim 3, wherein said high frequency second addressing signal applied to the electrode on the rear cell plate which does not overlap any display segment has an amplitude of approximately 10 volts and a frequency of approximately 30 Hz, and said transition voltage of said electro-optic medium is approximately 7.5 volts.

* * * * *